May 12, 1953  C. GABRIELSEN  2,638,396
SANDWICH VENDING MACHINE
Filed Aug. 2, 1950  6 Sheets-Sheet 5

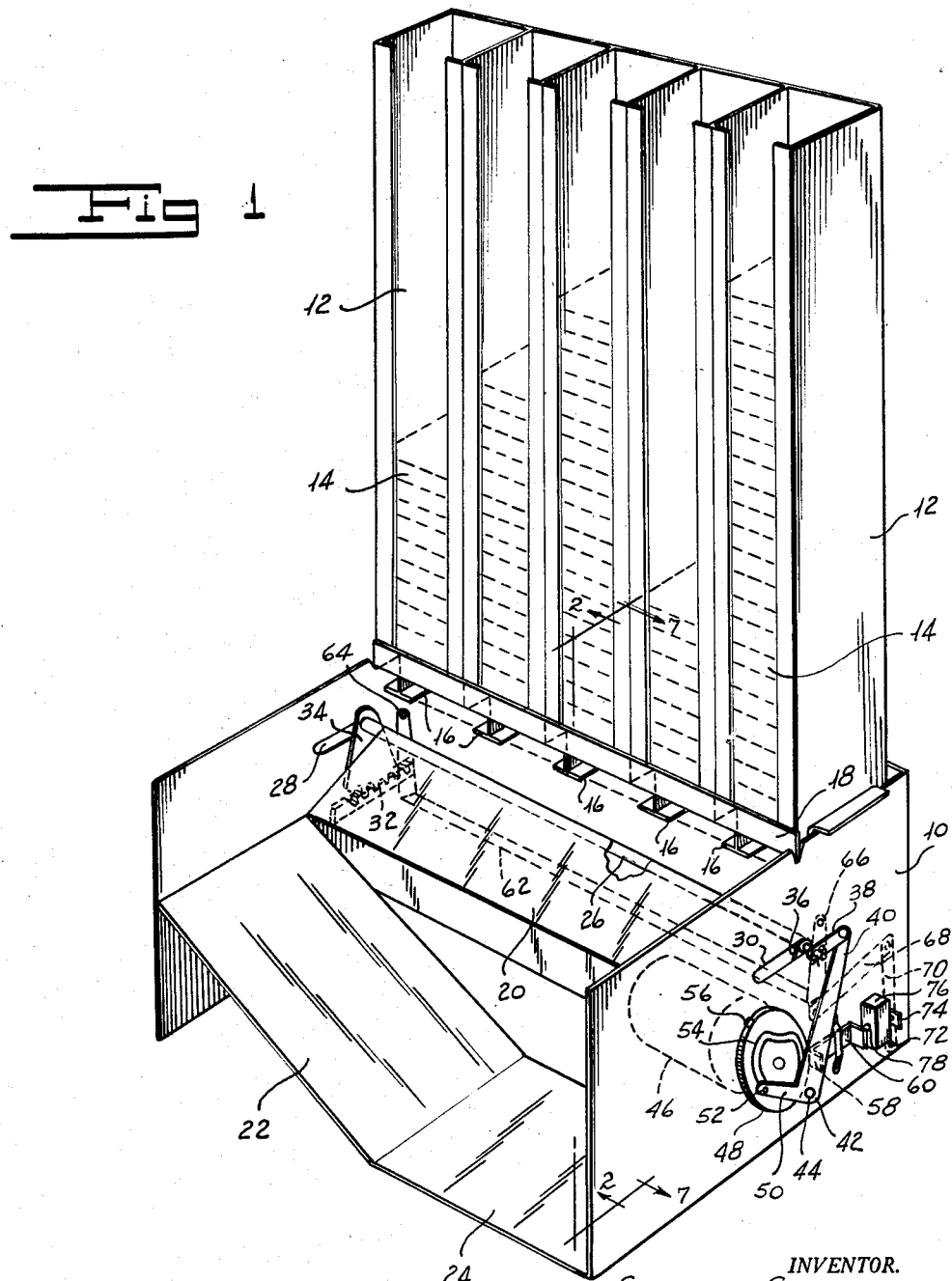

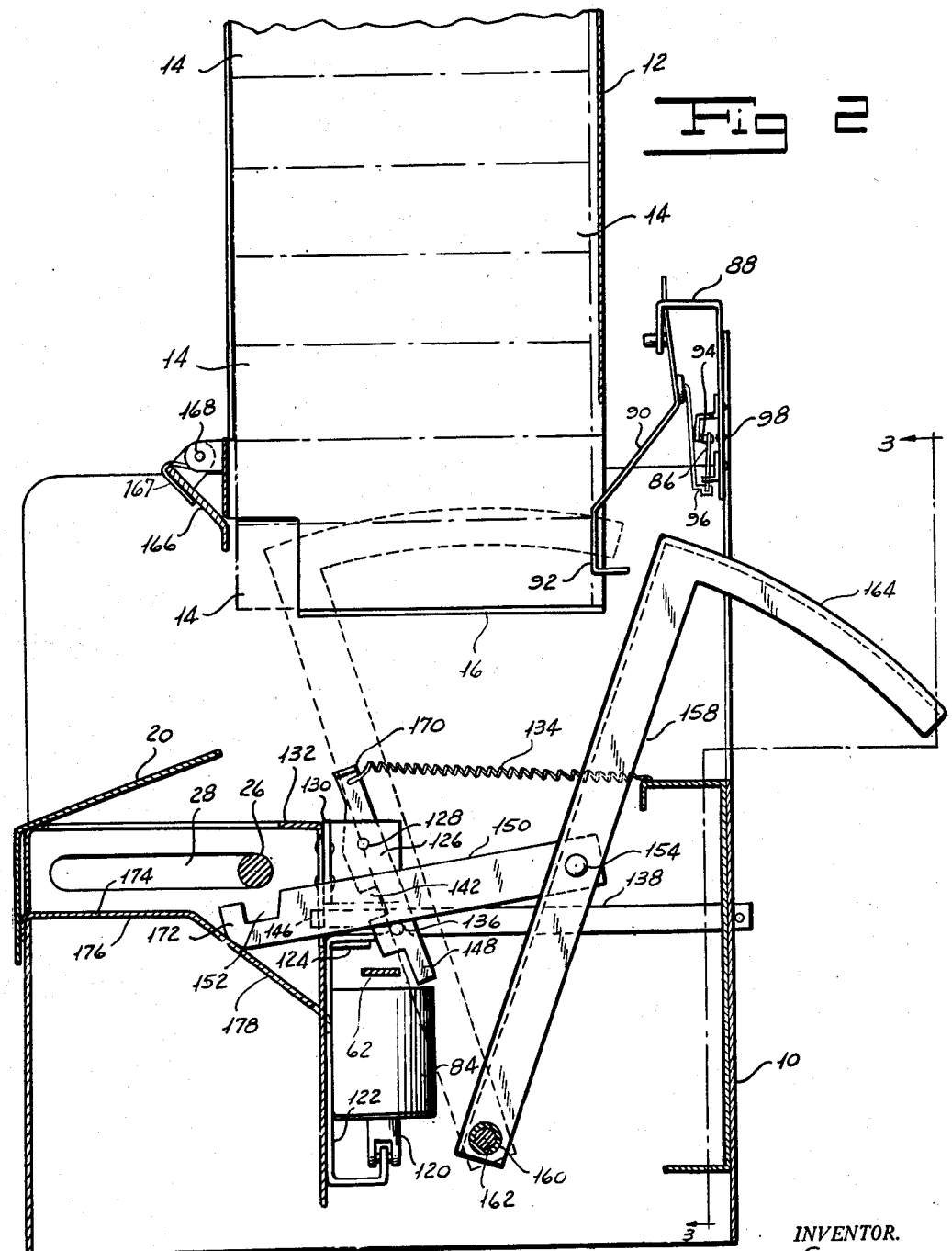

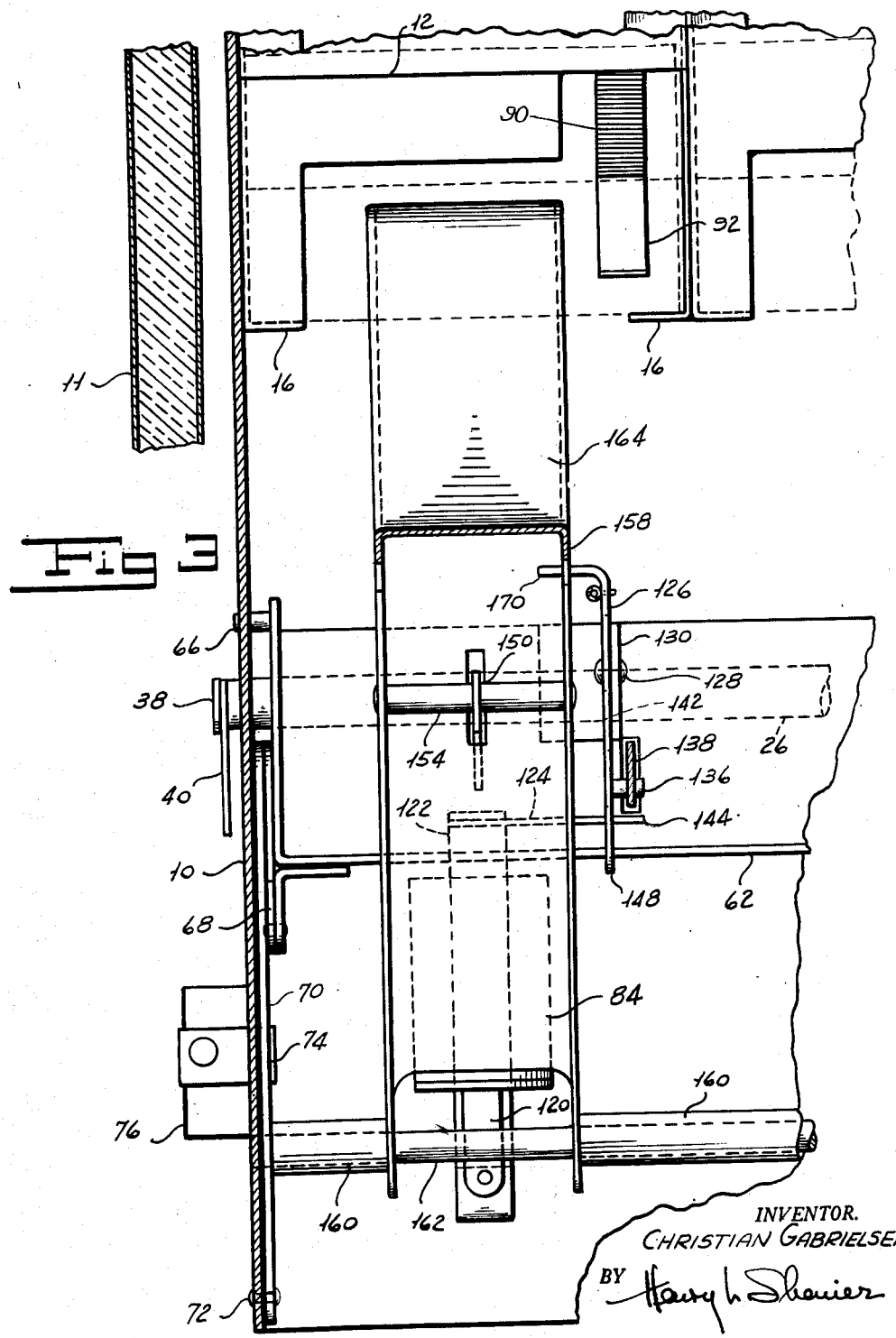

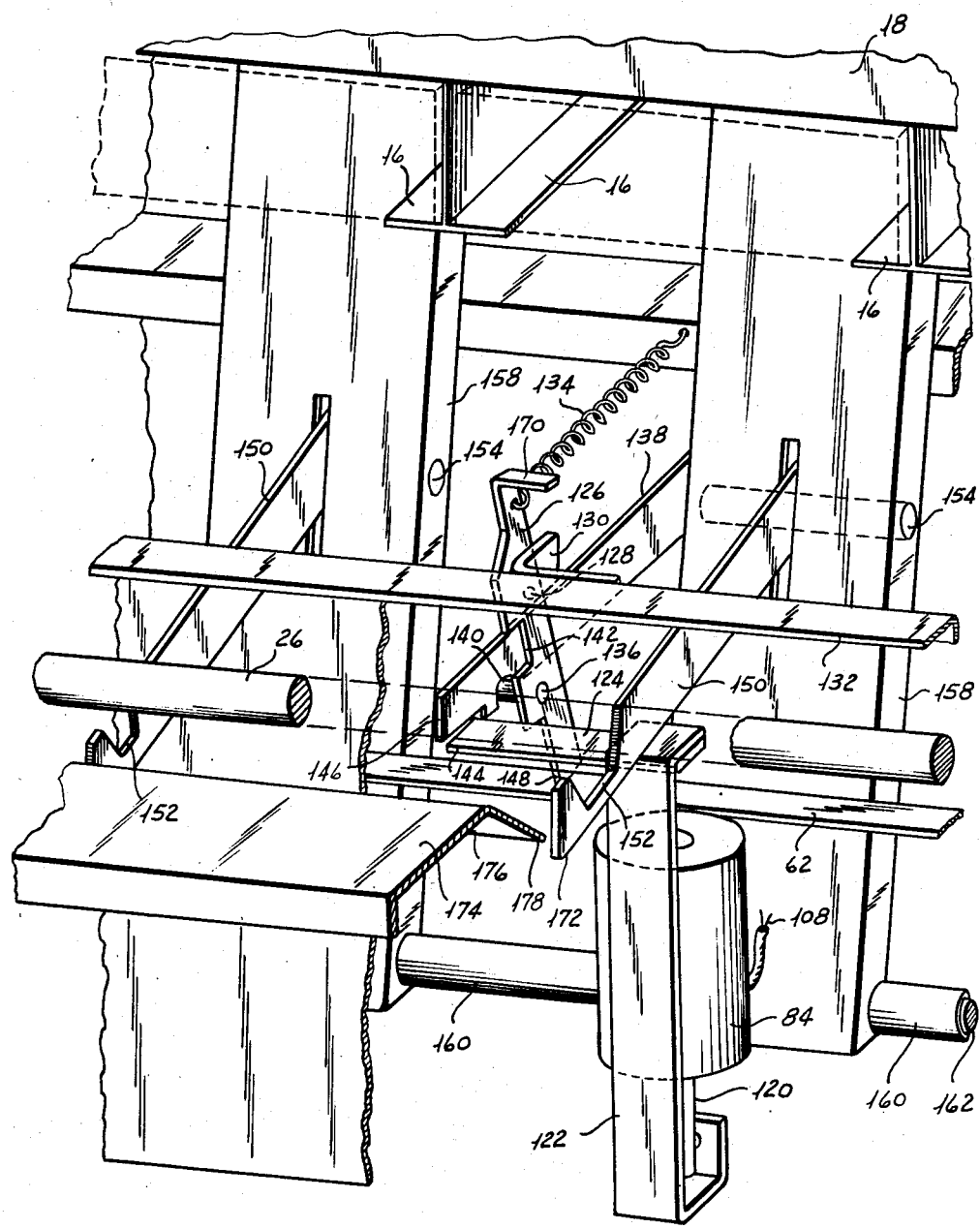

INVENTOR.
CHRISTIAN GABRIELSEN
BY
ATTORNEY

May 12, 1953  C. GABRIELSEN  2,638,396
SANDWICH VENDING MACHINE
Filed Aug. 2, 1950  6 Sheets-Sheet 6
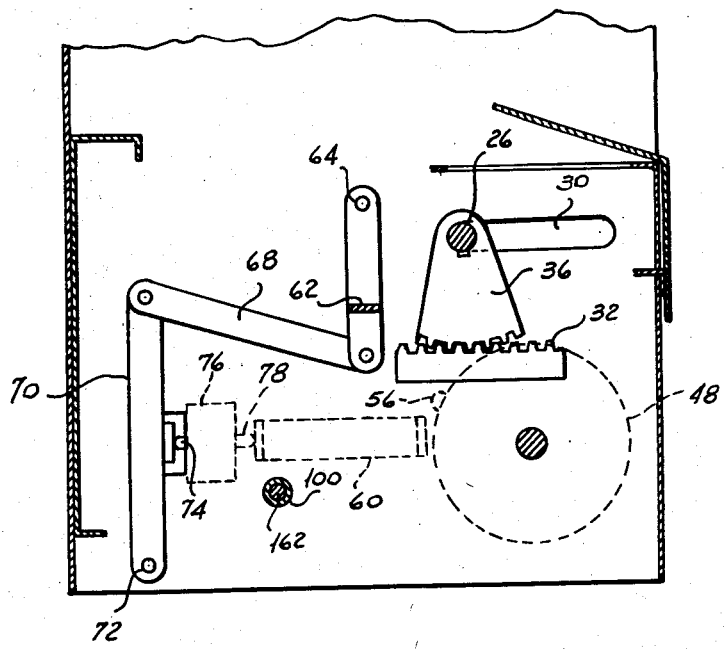
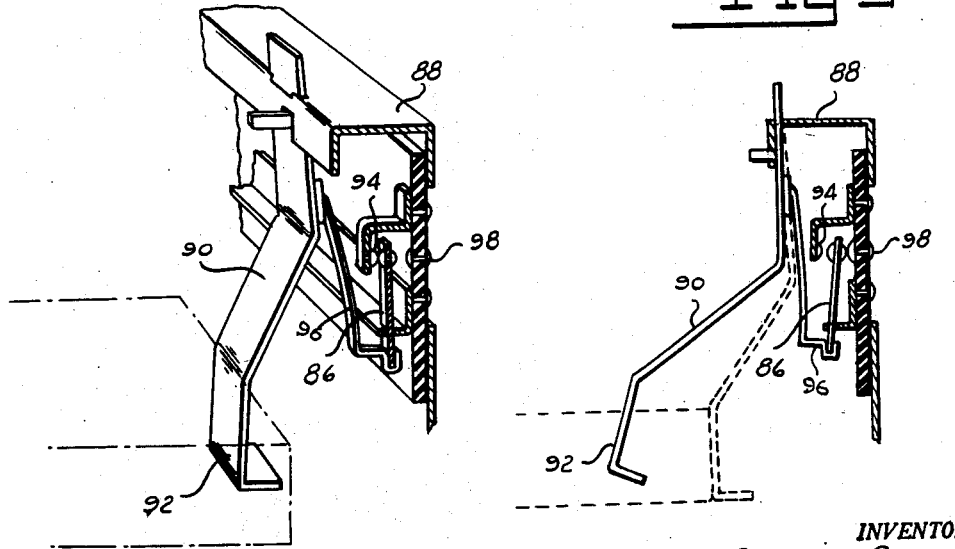
INVENTOR.
CHRISTIAN GABRIELSEN
BY Henry L. Shevier
ATTORNEY Patented May 12, 1953

2,638,396

UNITED STATES PATENT OFFICE 2,638,396

SANDWICH VENDING MACHINE

Christian Gabrielsen, Whippany, N. J., assignor to Rowe Manufacturing Co., Inc., Whippany, N. J., a corporation of New York Application August 2, 1950, Serial No. 177,159

9 Claims. (Cl. 312—65)

My invention relates to a novel and improved sandwich vending machine adapted to vend the sandwiches selected by a user from an electrically operated merchandising machine in response to the actuation of a push button.

Sandwiches may be packed in boxes of the same shape and size and stacked in columns and dispensed from an automatic merchandising machine similar to those now in use for cigarettes and other stackable commodities. Sandwiches, however, usually contain meat, cheese, fish and other labile food products which are likely to spoil unless preserved in a refrigerated atmosphere adapted to retard the processes involved in the spoiling of food products. The placing of a dispensing mechanism in a refrigerated atmosphere, however, introduces a number of problems. The selecting and operating mechanism must be able to dispense in the refrigerated container, which must be insulated from the outside atmosphere if the refrigeration is to be effective. The controls for the selecting and dispensing mechanism, however, must be available outside of the refrigerated space for ready operation by the user. The customary mechanisms in use for cigarette machines cannot be conveniently employed because of the complications produced by the necessity for refrigeration.

One object of my invention is to provide an electrical merchandising machine adapted to be controlled by the deposit of coins in proper denominations and the simple operation of a push button.

Another object of my invention is to provide an electrically controlled and operated merchandising machine adapted to vend articles from a plurality of columns in which a separate push button is provided for each column.

Another object of my invention is to provide a merchandising machine adapted to operate electrically by a plurality of push buttons adapted to initiate a common prime mover and to select merchandise from the column associated with the push button.

Another object of my invention is to provide an improved electrical automatic merchandising machine.

Other and further objects of my invention will appear from the following description.

In general my invention contemplates the provision of a refrigerated cabinet in which I place a plurality of vertical columns containing the merchandise, such as sandwiches or the like, adapted to be dispensed. Each column is provided with a push button controlling a solenoid associated therewith. A common prime mover having an operating bar furnishes the power for operating the dispensing mechanism associated with each column. The actuation of a push button associated with a column will operate the solenoid associated therewith when coins of the proper denomination are placed in the coin register. The solenoid connects the dispensing mechanism to the operating bar and releases a switch operating member adapted to initiate the action of the prime mover. The arrangement is such that after the sandwich or other merchandise is dispensed from the column selected, the parts are automatically restored to initial position and cannot again be operated without the deposit of coins. When merchandise from a column is depleted the circuit through the solenoid associated therewith is broken through an empty lock which automatically energizes a second circuit so that when the push button is pressed a signal is given to the user indicating that the column is empty. The customary slide locks known to the art are associated with the push buttons so that only one push button at a time may be pressed. The dispensing mechanism is a pivoted member adapted to eject one sandwich and support the column of sandwiches above it during the dispensing action.

In the accompanying drawings which form part of the instant specification and which are to be read in conjunction therewith and in which like reference numerals are used to indicate like parts in the various views:

Figure 1 is a perspective view of a portion of my merchandising machine with parts omitted and shown removed from the refrigerated cabinet in which they are adapted to be housed.

Figure 2 is a sectional elevation drawn on an enlarged scale of a portion of my merchandising machine removed from the refrigerated cabinet in which it is normally positioned, viewed along the plane 2—2 of Figure 1.

Figure 3 is a fragmentary section of my merchandising machine viewed along the line 3—3 of Figure 2.

Figure 4 is a perspective view drawn on an enlarged scale of a portion of my merchandising machine with parts broken away viewed from the front.

Figure 5 is a diagrammatic view showing the electrical circuit involved in the operating motor.

Figure 6 is a diagrammatic view showing the electrical circuit involved in the initiation and selection assembly of my machine.

Figure 7 is a fragmentary sectional view drawn on an enlarged scale viewed along the line 7—7 of Figure 1.

Figure 8 is a fragmentary perspective view showing the empty switch in position when merchandise is in a vending column.

Figure 9 is a fragmentary sectional view showing the position of parts of the empty switch when a column is depleted of merchandise.

More particularly referring now to the drawings, a framework 10 of any suitable construction is adapted to be positioned within a refrigerated housing 11, a portion of which is shown in Figure 3, of any suitable size or design. The interior of the housing is maintained at a suitable low temperature by means of refrigeration machinery well known to the art. Refrigerated housing forms no part of the instant invention and is therefore not shown or described in detail. The frame 10 supports a plurality of columns 12 which are adapted to hold sandwiches 14 packed in cardboard boxes or the like so each will have uniform dimensions. The stacks of sandwiches 14 are held in the columns by separated flanges 16 positioned adjacent the bottom of each column. The brace member 18 is positioned above the flanges 16 through a distance slightly in excess of the thickness of each article 14 to be dispensed. The dispensing mechanism, which will be described more fully hereinafter, is adapted to push the bottommost portion of the stack forwardly so that it will fall upon the inclined baffle 20 extending across the front of the columns. From the inclined baffle 20 the sandwich or other article falls upon the inclined baffle 22 adapted to slide the article to the shelf 24 which is made readily accessible from the exterior through a door in the refrigerated housing as is well known to the art. An operating bar 26 extends across the frame 10 in a pair of slots 28 and 30. A pair of racks 32 are carried by the frame on opposite sides thereof. Segments 34 and 36 are secured to the operating bar for rotation therewith and mesh with the racks 32. The arrangement is such that as the bar is moved to and fro in the slots 28 and 30 it will rotate and move with parallel motion. The end of the operating bar 26 is secured to a link 38 which is attached to the upper end of the arm 40 of the bell crank 42 which is pivoted about shaft 44 carried by the frame 10. The end of link 38 is attached to the operating bar in any appropriate manner, as, for example, by providing the end of link 38 with an opening through which the projecting end of the operating bar 26 passes and then providing a cotter pin to hold the link in place. The frame carries an electrical motor 46 which is adapted to rotate a cam 48. The other arm 50 of the bell crank 42 is provided with a follower 52 which is lodged in a cam groove 54 formed in the operating cam 48. The arrangement is such that the rotation of the motor will rock the upper arm 40 back and forth carrying the operating bar 26 with it through the action of the link 38. The edge of the cam 48 is provided with a lug 56 adapted to contact the flange 58 formed upon the reciprocal member 60. A U-shaped switch operating member 62 is pivotally carried by the frame 10 by means of pivot pins 64 and 66. The lower end of the U-shaped member adjacent one end of the frame is pivotally secured to a switch operating link 68, the other end of which is secured to a switch operating lever 70. When the member 62 swings forwardly, the lever 70 will pivot about its pivot pin 72 in a counterclockwise direction, as viewed in Figure 1, striking the switch operating member 74 of the switch 76, initiating the action of the motor 46. The motor will continue to run until the lug 56 moves the member 60 to the right, as viewed in Figure 1, causing it to operate the switch member 78 stopping the operation of the motor. The electrical connections can readily be seen by reference to Figure 5 in which like reference numerals have been used to indicate like parts. The rocking of lever 70 in a counterclockwise direction initiates the action of the motor and the movement of member 78 to the right stops the action of the motor by breaking the circuit thereto.

Referring now to Figure 6, a coin register 80 of any suitable construction, preferably that shown in copending application of Christian Gabrielsen et al. Serial No. 166,405 filed June 3, 1950, is adapted to control the energization of a plurality of push buttons 82 each of which is associated with one of the columns 12. The push buttons are carried by the housing externally of the machine and are associated with a slide lock arrangement well known to the art such as described in my copending application Serial No. 19,313 filed April 6, 1948, now Patent No. 2,546,690, whereby only one of the push buttons may be pressed at a time so that the actuation of one push button automatically locks the other push buttons and prevents them from being pressed simultaneously. Since all the operating parts are electrically controlled by the push buttons, as will be described more fully hereinafter, only a single cable need pass from the push button assembly into the refrigerated space, thus preventing loss of refrigeration and excessive condensation in the refrigerated atmosphere of water vapor. It might be pointed out here that the disposal of sandwiches in the refrigerated atmosphere maintains the bread of the sandwiches in a fresh condition due to the fact that the refrigeration keeps the refrigerated atmosphere at a high relative humidity and prevents the bread from drying out and becoming stale too rapidly. By means of refrigeration, sandwiches may be kept fresh for several days.

Still referring to Figure 6, coins deposited in the coin register 80 complete the initial part of a circuit containing a plurality of solenoids 84 connected in parallel with each other and in series with the coin register and respectively in series with individual push buttons 82. When a push button is pressed, the circuit is adapted to be completed through a respective switch arm 86 which forms part of the empty lock and empty signal system. The construction of the empty lock is shown in Figure 2. The frame 10 supports a bracket 88 which carries a plurality of spring members 90, one being provided for each column. When sandwiches 14 are positioned in a column the spring member 90 is urged to the right through contact of its lower portion 92 with sandwiches in the column. This causes the switch arm 86 to make contact with contact point 94 and to complete the circuit controlled by the push button 82 in normal operation. When the spring member 90 moves to the left, as shown in Figure 2, due to the absence of sandwiches from the column 12, the member 96 will cause the switch arm 86 to make contact with contact point 98 and to break contact with contact point 94. When the switch arm 86 is in contact with contact point 98, operation of the push button will energize the incandescent lamp 100 adapted to signal that the column controlled by the particular push button pressed is empty, as can readily be seen by reference to Figure 6. The energy for the incandescent lamp is furnished by a low voltage source such as a battery 102 or, in event of the use of alternating current, by a low voltage winding on a transformer. The higher voltage required to operate a solenoid 84 is isolated from the low voltage source 102 by means of a resistor 104. The resistor, further, prevents sufficient current from flowing through the winding of solenoid 84 in event that the circuit for the incandescent lamp 100 is short-circuited. The resistance is sufficiently high to present a current density sufficiently high to operate the solenoid from the battery or the low voltage source 102. It will be seen, therefore, that with sandwiches in the machine so that arm 86 is in contact with contact point 94 and with proper coins in the coin register 80, the pressing of the push button 82 will permit current to flow from the positive terminal 106 through the push button armature, through the winding of solenoid 84, through conductor 108, through the coin register, to the negative terminal 110, energizing the solenoid 84 associated with the push button pressed. If the empty lock permits the switch arm 86 to make contact with contact point 98, the pressing of the button will permit current to flow from the positive terminal of the battery 102 through the incandescent lamp 100 to contact point 98, through the switch arm 86, through the armature button 82, through the winding of solenoid 84, through conductor 108, through the coin register 80, through conductor 112, through the resistor 104, to the other side of the potential source. The resistor 104, together with the resistance of the incandescent lamp, serves to keep the current density through the solenoid winding so low that it will not operate. Its value is such that even though the incandescent lamp were short-circuited it will permit sufficient current from flowing through the solenoid winding to operate it.

The operation of the solenoid 84 will initiate the action of the dispensing mechanism, as will be described more fully hereinafter, and cause the operating bar to operate to dispense the merchandise. The coins deposited in the coin register 80 rest on the edge of a money shelf 114 supported by pivots 116 and 118. When the operating bar operates it tilts the money shelf to permit the coins to fall into a coin box 119.

Referring now to Figure 4, each solenoid 84 is provided with an armature 120 to which is secured a member 122 adapted to move upwardly with the armature 120 upon the energization of the winding of the solenoid 84. The upper portion of the member 122 carries horizontally disposed arm 124. Associated with each column I provide a switch arm actuating lever 126 pivotally secured by pivot 128 to a bracket 130 carried by an angle member 132 supported by the framework of the machine. A spring 134 urges the switch arm actuating lever 126 to rotate in a clockwise direction, as viewed in Figures 4 and 2. A pin 136 is carried by the actuating lever 126. A locking lever 138 has its rear end pivoted to the frame and is provided with a notch 140 engaging the pin 136, preventing the spring 134 from rotating the actuating lever 126 in a clockwise direction. The actuating lever 126 is also provided with a reentrant portion or notch 142 which is adapted to engage the horizontal arm 124. Whenever the armature 120 is moved upwardly through the energization of the solenoid by the actuation of its associated push button the member 122 will move upwardly carrying the arm 124 with it. The end 144 of the arm is disposed underneath the end 146 of the locking lever 138. The upward motion of the locking lever will lift its notch 140 clear of the pin 136 and permit the actuating lever 126 to rotate in a clockwise direction under the influence of the spring 134. The lower end 148 of the actuating lever will strike the switch operating arm 62 and rotate this in a clockwise direction, as viewed in Figure 2, pulling the link 68 forwardly and rotating the lever 70 in a counterclockwise direction so that switch operating member 74 will close the switch 76 to start the motor 46.

The member 122 is disposed underneath coupling lever 150 which is provided with a notch 152 adapted to engage the operating bar 26 when the lever 150 is rotated in a clockwise direction, as viewed in Figures 2 and 4. The arrangement is such that the notch 152 will be seated about the operating bar just before the locking lever 138 releases the switch actuating lever 126. When the lever 126 rotates under the influence of spring 134 the notch 142 carried by this lever will seat around horizontal arm 124. Since the pressing of the initiating button is only momentary, solenoid 84 will become de-energized when the button is released. Due to the fact that the notch 142 holds the horizontal member 124 upwardly, the coupling lever 150 will be retained in coupling position with the operating bar, and the locking lever 138 will be retained in unlocking position.

The coupling lever 150 is pivotally carried by pin 154 carried by the ejecting member 158. The ejecting member is supported at its lower end by a shaft 162 carried by the frame 10. Sleeves 160 positioned about the shaft 162 maintain the ejecting members 158 in properly spaced position. The upper end of the ejecting member 158 is provided with an arcuate extension 164. As the operating bar 26 moves to the left, as viewed in Figure 2, with the coupling lever 150 in coupled position, the ejecting member 158 will pivot about the shaft 162 and eject the bottommost sandwich or other article 14 contained in the column 12 associated with the ejecting member being operated. The forward upper portion of the ejecting member will push the bottommost package 14 forwardly against the action of a spring loaded gate 166, biased by spring 167, which normally prevents the bottommost package 14 from being jarred or fished out of the machine. There is a direct and strong connection between the operating bar and the ejecting member 158 which is being operated by an electric motor usually provided with a gear reduction to provide a high output torque. The force is ample to pivot the spring loaded gate about its pivot 168 to permit the package to be ejected. The arcuate portion 164 supports the column of articles during the ejection and permits them to fall as soon as the operating bar moves the ejector member to the right clear of the column, thus automatically positioning another article for ejection during the next operating cycle. The upper end of the switch actuating lever 126 is provided with a horizontally disposed lug 170 which projects across the path of movement of the ejecting member 158 and is so positioned that just after the merchandise is ejected it will be contacted by the front edge of the ejecting member and rotated in a counterclockwise direction against the action of spring 134. When this occurs the notch 142 will be carried clear of the horizontal arm 124 which will permit the locking lever 138 to drop, again engaging the pin 136 and holding the switch actuating lever 126 in its ready position for the next operation. When the operating bar is at the left, as viewed in Figure 2, the end 172 of the lever will rest upon the horizontal portion 174 of the plate 176, thus preventing the coupling lever from becoming disengaged even though the member 122 and the armature 120 have dropped due to their release from the retaining notch in the switch actuating lever. The inclined portion 178 of the plate 176 is so positioned that it will permit the coupling lever 150 to disengage after the ejecting member 158 is moved backwardly to the position shown in Figure 2 just as the operating bar 26 leaves the end of its stroke to the right at the time when the lug 56 acts to de-energize the motor, thus uncoupling the coupling lever 150 from the operating bar and placing the parts in position for the next cycle of operation.

In operation let us assume that the columns are loaded with sandwiches and the refrigerated cabinet is placed on location with the refrigeration operating. A purchaser selects the type of sandwich he desires from legends adjacent the push buttons, which may be placed at any convenient place on the machine since the machine is completely enclosed except for the access door through which sandwiches are delivered to a user. The user deposits the correct coins in the coin register and then presses the button. This energizes the solenoid 84 associated with the column in which the sandwich is selected. The armature will move upwardly unlocking the switch actuating lever 126 and coupling the coupling lever 150 to the operating bar. The switch actuating lever will rotate to actuate the switch starting button starting the motor 46 and will lock the member 122 in the upward position by means of the notch 142 through engagement with the horizontal arm 124. This permits the coupling lever 150 to remain in coupled position during the initial part of the movement of the operating bar 26. As the operating bar moves forwardly it will pivot the ejecting member 158 to deliver a sandwich. Just before it completes its forward movement it will pivot the switch actuating member 126 in a counterclockwise direction through the action of lug 170, as viewed in Figure 2, to release the horizontal member 124 from the notch 142 to permit the armature to drop. The operating bar will complete its cycle pivoting the ejector in a clockwise direction, as viewed in Figure 2. As the end of the cycle is approached, the coupling lever 150 will move down the inclined portion 178 of the plate 176 automatically permitting the coupling lever 150 to uncouple by gravity. If a column becomes depleted of merchandise, the pressing of the button 82 will not energize the solenoid 84 but will, on the other hand, complete a circuit through the signal lamp to inform the user that the column is depleted of merchandise. Since the operating bar is not operated, the coins will remain in the coin register and another button may be pressed. If all of the columns are empty or if the user does not desire the merchandise in the other columns, a coin return, known to the art, may be actuated and the coins returned to the user from the register.

It will be seen that I have accomplished the objects of my invention.

I have provided an electrical merchandising machine adapted to be controlled by the deposit of coins which will vend sandwiches or other merchandise from a selected column by the simple operation of a push button.

I have provided an electrically controlled and operated merchandising machine having a separate push button associated with respective columns in which different merchandise may be placed in each of the columns.

I have provided a merchandising machine adapted to be operated electrically by a plurality of push buttons in which the operation of a push button selects the merchandise to be vended and initiates the action of a prime mover.

I have provided an improved electrical automatic merchandising machine in which all the operating mechanism is controlled by a push button so that the mechanism may be placed in a refrigerated housing with efficiency and ease.

It will be understood that certain features and subcombinations are of utility and may be employed without reference to other features and sub-combinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A vending machine including in combination a plurality of substantially vertical columns adapted to support stacks of articles to be vended, a main prime mover, an operating member adapted to be actuated by said prime mover, a plurality of selector switches associated with respective columns, a plurality of electrically energizable moving means associated with respective selector switches, circuit means for said moving means controlled by said selector switches, a switch for energizing the prime mover, a plurality of ejecting means associated with respective columns adapted to eject the bottommost article of a stack from each column, coupling means associated with each of said ejecting means adapted to couple a respective ejecting means to said operating member, a plurality of switch operating members associated with respective columns each adapted to actuate said switch for energizing the main prime mover, means responsive to the energization of one of said electrically energizable moving means for actuating a switch operating member to initiate the action of the main prime mover and to move a coupling means to coupled position.

2. A vending machine as in claim 1 in which said electrically energizable moving means comprise solenoids.

3. A vending machine as in claim 1 in which each of said ejecting means comprises a pivoted member formed with an arcuate surface adapted simultaneously to eject the bottommost article from a column and to support the remaining articles in the column upon said arcuate surface.

4. A vending machine as in claim 1 including means for maintaining said coupling means in coupled position after the de-energization of said electrically energizable moving means.

5. A vending machine as in claim 1 in which each of said switch operating members comprises a pivoted lever, means for biasing said lever to rotate to switch operating position, locking means for holding said switch operating lever in nonswitch operating position against the action of said biasing means, and said means responsive to the energization of one of said electrically energizable moving means comprises a member adapted to move said locking means to unlocked position, and means responsive to the actuation of said lever for retaining said member in locking means unlocked position.

6. A vending machine as in claim 1 including in combination a cam plate positioned adjacent said operating bar, said cam plate being formed to hold said coupling means in coupled position after the operating bar has started its stroke and to permit said coupling means to move to uncoupled position after said operating bar has completed its stroke.

7. A vending machine as in claim 1 in which each of said columns is provided with a gate and resilient means for urging said gate to column closing position whereby to prevent an article from being jarred out of the column, said gate being constructed to pivot under the influence of said ejecting means to permit an article to be dispensed from a column.

8. A vending machine as in claim 1 in which each of said circuit means for said electrically energizable moving means includes an interrupter switch, a feeler member associated with each column adapted to move each respective interrupter switch to circuit making position when articles to be vended are positioned in a column and to move said interrupter switch to circuit breaking position when a column is empty.

9. A vending machine as in claim 1 including a signal circuit in parallel with respective circuit means for said moving means, an empty switch associated with each column, a feeler member adapted to move said empty switch to a position breaking the signal circuit when merchandise is in a column and to move said empty switch to a position completing the signal circuit when a column is empty, the construction being such that when a column is empty the operation of a selector switch will energize said signal circuit.

CHRISTIAN GABRIELSEN.

References Cited in the file of this patent

UNITED STATES PATENTS

| Number | Name | Date |
|---|---|---|
| 831,169 | Long | Sept. 18, 1906 |
| 2,323,981 | Du Grenier et al. | July 13, 1943 |
| 2,360,241 | Kuhl | Oct. 10, 1944 |
| 2,455,976 | Caruso | Dec. 14, 1948 |
| 2,496,689 | Balzer | Feb. 7, 1950 |
| 2,546,986 | Dressler | Apr. 3, 1951 |